US008917958B2

(12) United States Patent
Prosyk (10) Patent No.: US 8,917,958 B2
(45) Date of Patent: Dec. 23, 2014

(54) ELECTRICAL WAVEGUIDE TRANSMISSION DEVICE FOR USE WITH A MACH-ZEHNDER OPTICAL MODULATOR

(71) Applicant: COGO Optronics, Inc., Boulder, CO (US)

(72) Inventor: Kelvin Prosyk, Luskville (CA)

(73) Assignee: Teraxion Inc. (CA)

( * ) Notice: Subject to any disclaimer, the term of this patent is extended or adjusted under 35 U.S.C. 154(b) by 211 days.

(21) Appl. No.: 13/722,400

(22) Filed: Dec. 20, 2012

(65) Prior Publication Data
US 2013/0163913 A1 Jun. 27, 2013

Related U.S. Application Data

(60) Provisional application No. 61/579,104, filed on Dec. 22, 2011.

(51) Int. Cl.
G02F 1/035 (2006.01)
G02F 1/225 (2006.01)

(52) U.S. Cl.
CPC .............. G02F 1/035 (2013.01); G02F 1/225 (2013.01); G02F 2201/126 (2013.01)
USPC ........................................ 385/3; 385/1; 385/2

(58) Field of Classification Search
CPC .......................... G02B 6/2935; G02B 6/29352
See application file for complete search history.

(56) References Cited

U.S. PATENT DOCUMENTS

| 6,897,739 | B2 | 5/2005 | Chan et al. | |
|---|---|---|---|---|
| 7,197,222 | B1 | 3/2007 | Koenig | |
| 7,324,257 | B2 * | 1/2008 | McBrien et al. | 359/245 |
| 7,343,055 | B2 * | 3/2008 | McBrien et al. | 385/2 |
| 7,408,693 | B2 * | 8/2008 | Kissa et al. | 359/245 |
| 7,809,216 | B2 * | 10/2010 | Cox, III | 385/2 |
| 7,899,277 | B2 * | 3/2011 | Koh | 385/2 |
| 2005/0147351 | A1 | 7/2005 | Johnstone et al. | |
| 2009/0003841 | A1 | 1/2009 | Ghidini et al. | |
| 2010/0266234 | A1 | 10/2010 | Kinpara et al. | |
| 2013/0163913 | A1 * | 6/2013 | Prosyk | 385/3 |
| 2013/0209023 | A1 * | 8/2013 | Prosyk | 385/3 |
| 2014/0153860 | A1 * | 6/2014 | Prosyk | 385/3 |

OTHER PUBLICATIONS

H. N. Klein et al., "1.55 μm Mach-Zehnder Modulators on InP for optical 40/80 Gbit/s transmission networks," OFC/NFOEC 2006, paper TuA2, pp. 171-173.

R. G. Walker, "High-Speed III-V Semiconductor Intensity Modulators," IEEE Journal of Quantum Electronics, vol. 27, No. 3, Mar. 1991, pp. 654-667.

K. Tsuzuki et al., "40 Gbit/s n-i-n InP Mach-Zehnder modulator with a π voltage of 2.2 V," Electronics Letters, vol. 39, No. 20, Oct. 2, 2003, 2 pages.

(Continued)

Primary Examiner — Rhonda Peace
(74) Attorney, Agent, or Firm — Hovey Williams LLP (57) ABSTRACT

An electrical waveguide transmission device accepts a differential electrical input signal (e.g., S+ and S−) propagating along two separate signal conductors with grounded electrical return paths, and outputs the differential input signal to a series push-pull traveling wave electrode Mach-Zehnder optical modulator over a pair of output conductors that act as a return path for each other and provide a desired characteristic impedance matching that of the Mach-Zehnder optical modulator.

10 Claims, 11 Drawing Sheets

(56) References Cited

OTHER PUBLICATIONS

S. Akiyama et al., "Wide-Wavelength-Band (30 nm) 10-Gb/s Operation of InP-Based Mach-Zehnder Modulator With Constant Driving Voltage of 2 Vpp," IEEE Photonics Technology Letters, vol. 17(7), 2005, pp. 1408-1410.

I. Betty et al., "Zero Chirp 10 Gb/s MQW InP Mach-Zehnder Transmitter with Full-Band Turnability," OFC/NFOEC 2007, paper OWH6, 3 pages.

Beling, A. et al., "High power 1550 nm twin-photodetector modules with 45 GHz bandwidth based on InP," Optical Fiber Communication Conference and Exhibit, 2002, OFC 2002, pp. 274-276, Mar. 17-22, 2002.

PCT International Search Report and Written Opinion of the International Searching Authority for International Application No. PCT/US2012/071205, date of mailing Mar. 13, 2013, 10 pages.

* cited by examiner

ELECTRICAL WAVEGUIDE TRANSMISSION DEVICE FOR USE WITH A MACH-ZEHNDER OPTICAL MODULATOR

RELATED APPLICATION

The present application is based on and claims priority to the Applicant's U.S. Provisional Patent Application 61/579,104, entitled "Electrical Waveguide Transmission Device For Use With A Mach-Zehnder Optical Modulator," filed on Dec. 22, 2011.

BACKGROUND OF THE INVENTION

1. Field of the Invention

The present invention relates generally to the field of electrical waveguide components used for driving a series push-pull traveling wave electrode Mach-Zehnder optical modulator. More specifically, the present invention discloses an electrical waveguide transmission device that receives at the input a differential pair of modulated electrical signals propagating along two separate signal conducts with grounded electrical return paths, and outputs the differential signal over a pair of output conductors that act as a return path for each other and provide a desired characteristic impedance matching that of the Mach-Zehnder modulator.

2. Background of the Invention

Mach-Zehnder optical modulators have been employed for many years in the field of optical communications to accept modulated data in electrical (e.g., radio frequency) format and transfer the data onto an optical carrier. In a Mach-Zehnder optical modulator, a beam splitter divides the laser light into two paths, at least one of which has a phase modulator in which the refractive index is a function of the strength of the local electric field. The beams are then recombined. Changing the electric field on the phase modulating path will then determine whether the two beams interfere constructively or destructively at the output, and thereby control the amplitude or intensity of the exiting light.

Figure 1:
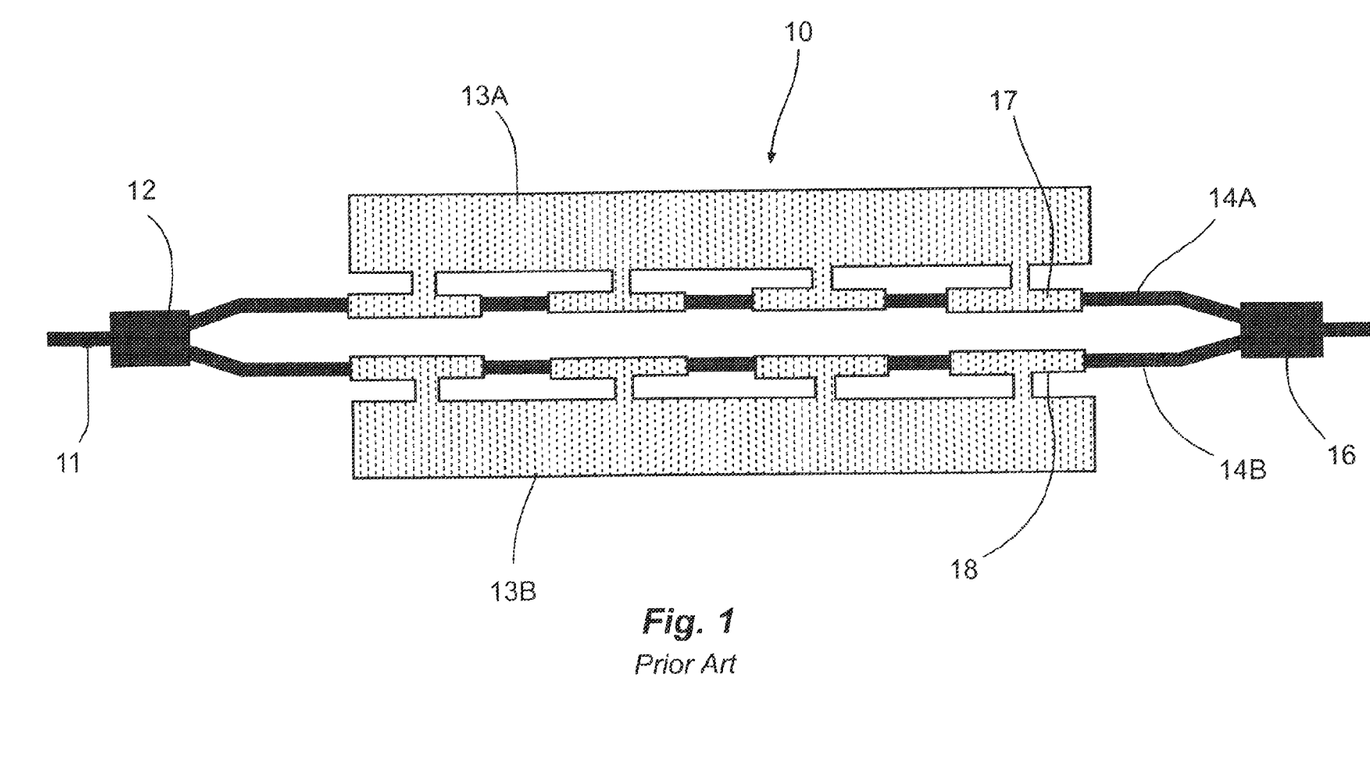
FIG. 1 is a simplified schematic diagram of a prior-art series push-pull traveling wave electrode Mach-Zehnder optical modulator 10 with single-ended drive modulation.

Some Mach-Zehnder optical modulators employ a series push-pull travelling wave electrode, as shown in FIG. 1, after Klein et al., "1.55 µm Mach-Zehnder Modulators on InP for optical 40/80 Gbit/s transmission networks", OFC/NFOEC 2006, paper TuA2, and is described in further detail by R. G. Walker, "High-Speed III-V Semiconductor Intensity Modulators", IEEE J. Quant. Elect., vol. 27(3), pp. 654-667, 1991. A travelling wave electrode (or TWE) consists of two or more transmission line conductors oriented substantially parallel to the optical paths, and a plurality of waveguide electrodes. Each waveguide electrode is connected to at least one of the transmission line conductors via a tap or bridge conductor. Each bridge conductor branches out of a transmission line conductor in a direction substantially perpendicular to the optical path. The transmission line conductors convey an RF signal in an RF path that is substantially parallel to the optical paths. Each pair of waveguide electrodes act as a pair of capacitors in series to each other and as a load to the main transmission line, and impart a phase change to the optical wave in the waveguide.

As shown in FIG. 1, a series push-pull travelling wave electrode Mach-Zehnder optical modulator typically includes: (1) an input optical waveguide 11 for receiving an input optical signal; (2) a splitting means 12 for splitting the optical signal into a first optical branch and a second optical branch; (3) first and second optical waveguides 14A, 14B conveying the light from the two branches of the optical signal, respectively; (4) two or more transmission line conductors 13A, 13B for receiving and conveying an input electrical signal; (5) a plurality of pairs of waveguide electrodes 17, 18 positioned adjacent to the first and second optical waveguides 14A and 14B, respectively, and electrically connected to the respective transmission line conductors 13A, 13B, so that the waveguide electrodes 17, 18 alter the phase of the optical signal in response to the input electrical signal; and (6) a combining means 16 recombines the beams at the output of the optical modulator 10. It should be noted that the optical and electrical signals propagate in substantially the same direction along the optical modulator 10.

Figure 2:
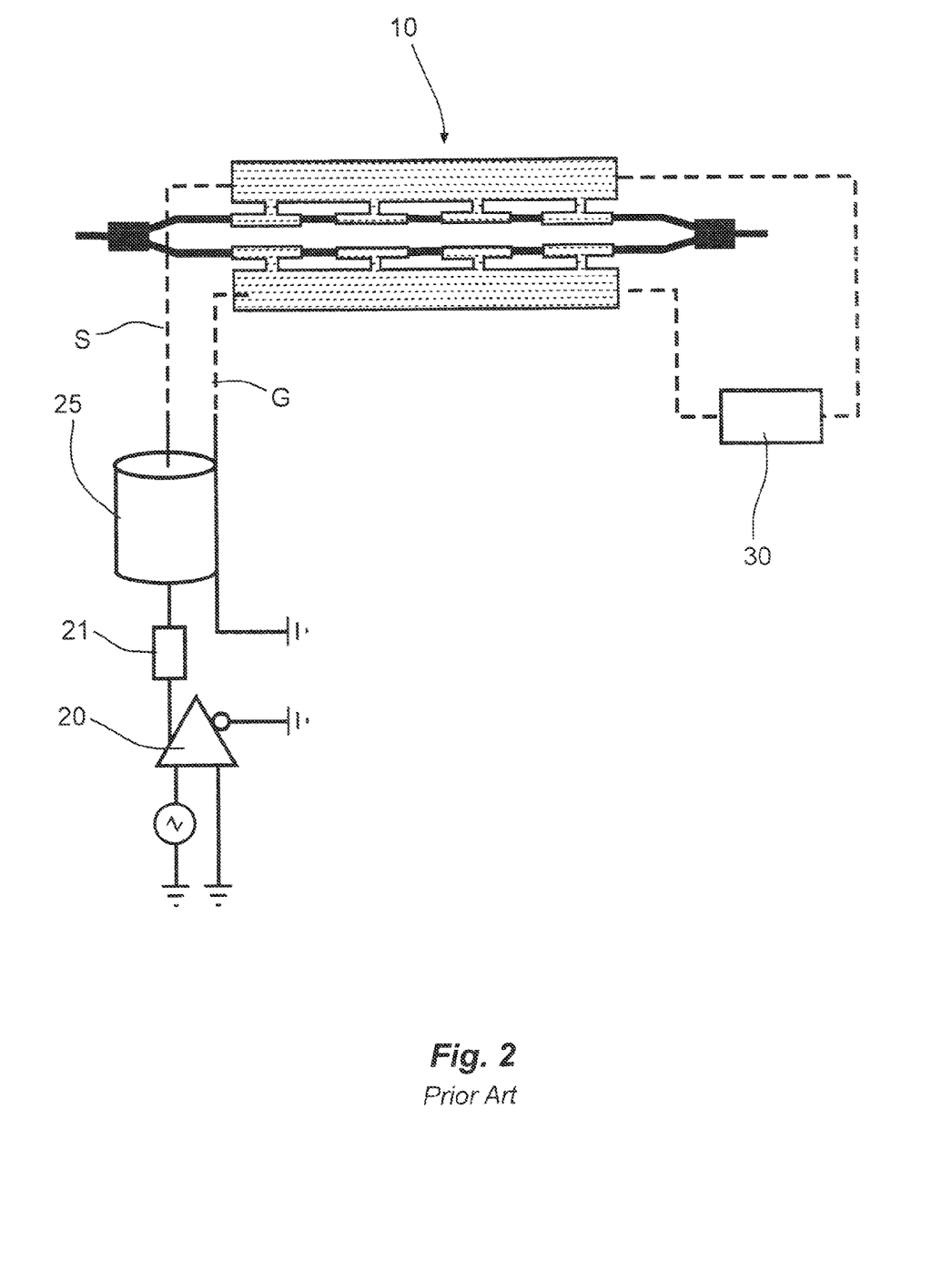
FIG. 2 is a schematic diagram showing how the Mach-Zehnder optical modulator 10 in FIG. 1 can be driven with a single-end driver through a single coaxial cable 25.

The prior-art travelling wave modulator shown in FIG. 1 employs two transmission line conductors 13A and 13B, one of which carries the input electrical signal (S) and the other of which is connected to a reference or ground (G) potential. This is sometimes referred to an SG configuration. A conventional approach to driving this configuration, known as single-ended drive, is illustrated in FIG. 2. One output of an RF driver 20 having an output impedance 21 is connected to the S transmission line conductor of the optical modulator 10 via, e.g., the center conductor of a co-axial cable 25. The other output of the RF driver 20 is grounded and connected to the G transmission line conductor of the modulator 10 via, e.g., the outer conductor of a co-axial cable. A nominal terminal load 30 (e.g. 50 ohms) connects the distal ends of the travelling wave electrode. It should be noted that the modulation voltage across the S and G conductors of the travelling wave electrode is the difference between the signal voltage and ground. This configuration has the disadvantage of losing a large fraction of the electrical power supplied by the RF driver 20.

Figure 3:
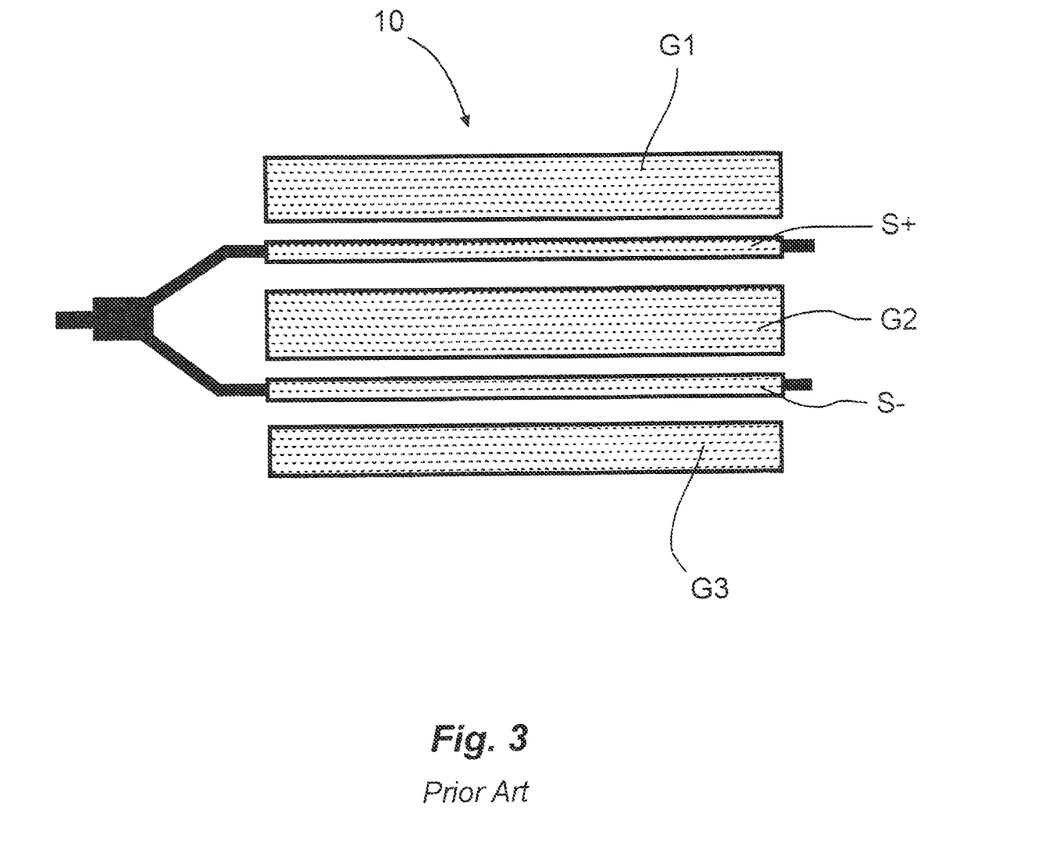
FIG. 3 is a schematic diagram of a prior-art independent drive (i.e., not series push pull) traveling wave electrode GSGSG optical modulator according to Tsuzuki.

In contrast to Klein, other traveling wave Mach-Zehnder modulators use a configuration shown in FIG. 3, employing five transmission line conductors. This type of modulator is described, for example, by Tsuzuki et al., "40 Gbit n-i-n InP Mach-Zehnder Modulator with a π Voltage of 2.2 V", Electronics Letters, vol. 39, no. 20, Oct. 2, 2003. The modulator consists of two independent signal transmission line conductors (S+ and S−), each with an adjacent ground transmission line conductor (G1 and G3, respectively), and with a ground transmission line conductor interposed between them (G2). Because of the interposed ground conductor G2, S+ and S− are electrically independent, and the current-return path of each is via G1/G2, and G2/G3, respectively. The nominal loads (e.g., two 100 ohm resistors in parallel) connect the distal ends of S+ with G1 and G2, and S− with G2 and G3.

Figure 4:
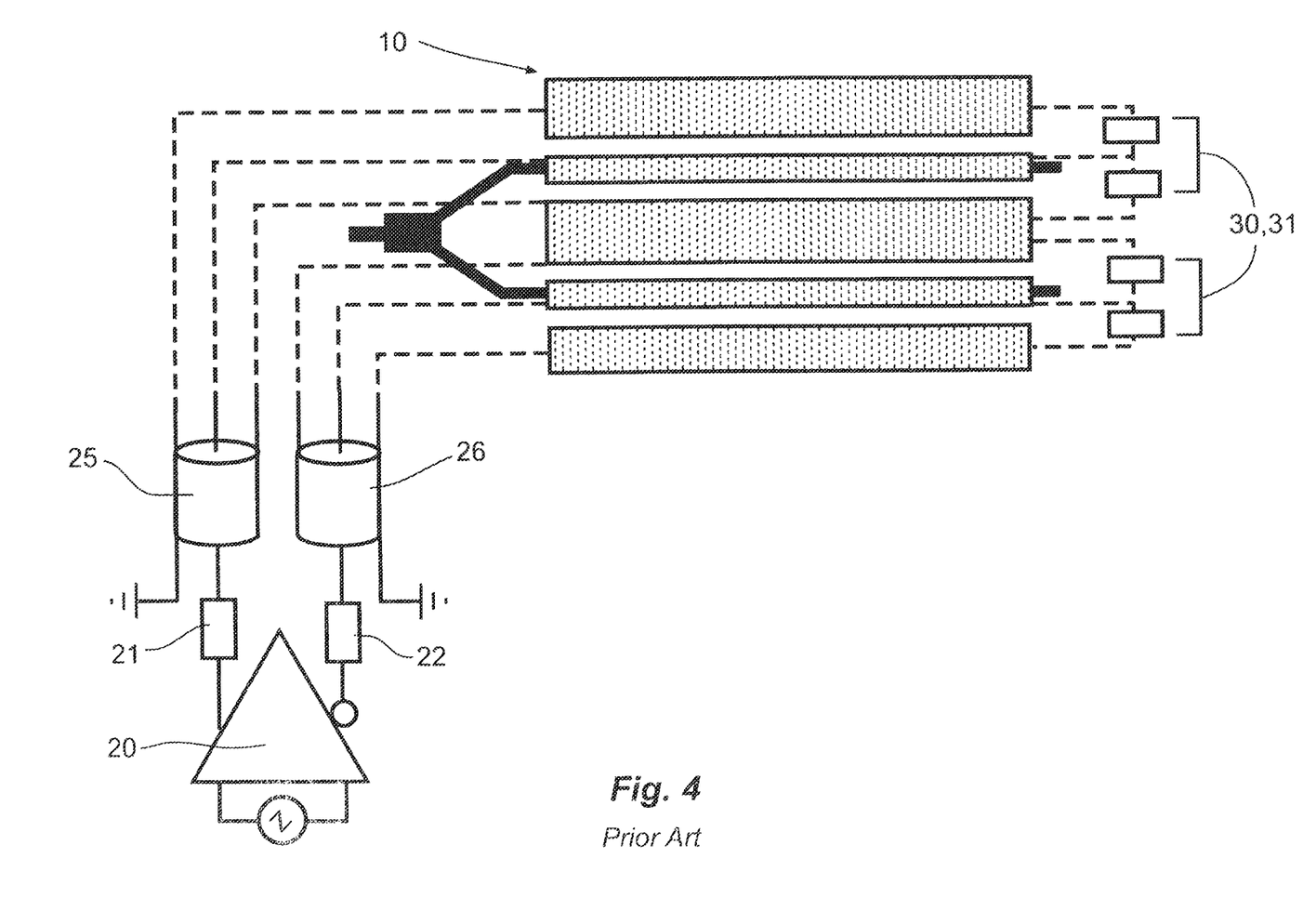
FIG. 4 is a schematic diagram showing how the optical modulator in FIG. 3 can be driven with a differential driver through a pair of coaxial cables 25, 26.

A conventional approach to driving this configuration, known as differential drive, is illustrated in FIG. 4. Both outputs (S+ and S−) of the RF driver 20 are connected through two waveguides (e.g., coaxial cables 25, 26) to the travelling wave electrodes, and the outer conductors of both coaxial cables 25, 26 are grounded. Both outputs of the RF driver have a characteristic output impedance 21, 22. In the case of differential drive modulation, the ground conductors of the two coaxial cables are connected to the ground transmission line conductors of the optical modulator 10. Nominal termination loads 30, 31 (e.g., 50 ohms for each of S+ and S−) are connected across the distal ends of the travelling wave electrodes. The outputs from the RF driver 20 are in anti-phase (i.e., S+ and S− are 180 degrees out of phase) and the modulation voltage across the travelling wave electrode is S+ minus S−. In this configuration both RF driver outputs are utilized, greatly improving the power efficiency compared to the single-ended drive condition.

A critical distinction between the optical modulator of Tsuzuki and the modulator of Klein is that Tsuzuki uses an independent traveling wave electrode for each of the first and second optical branches of the modulator. The signal lines of the device (S+ and S−) are electrically independent and have a ground return line interposed between them. In the case of a series push-pull Mach-Zehnder optical modulator as in FIGS. 1 and 2, the two transmission line conductors are coupled and act as a return path for each other. Therefore, Tsuzuki does not teach how to implement differential electrical drive with a series push-pull Mach-Zehnder optical modulator.

The prior art in this field also includes the following. An example of a GaAs/AlGaAs series push-pull travelling wave electrode Mach-Zehnder modulator was demonstrated by R. G. Walker, "High-Speed III-V Semiconductor Intensity Modulators", IEEE J. Quant. Elect., vol. 27(3), pp. 654-667, 1991. In his FIG. 13, Walker shows an incoming electrical waveguide consisting of a single (non-differential) signal conductor with two ground conductors. One of the ground conductors is open-terminated without contact to the Mach-Zehnder modulator. It should be noted that the Walker solution cannot use both S+ and S− signals from a differential driver, thereby losing a large fraction of the electrical power, and suffers from poor modulation performance due to the open-terminated ground conductor.

S. Akiyama et al., "Wide-Wavelength-Band (30 nm) 10-Gb/s Operation of InP-Based Mach-Zehnder Modulator With Constant Driving Voltage of 2 Vpp", IEEE Photon. Tech. Lett., vol. 17 (7), pp. 1408-1410, 2005, shows a Mach-Zehnder modulator similar to Klein, but does not show one of the conductors being grounded. However, the text of the paper describes "only one high-frequency signal" and does not teach how to transfer an electrical differential pair efficiently onto the Mach-Zehnder modulator.

I. Betty et al., "Zero Chirp 10 Gb/s MQW InP Mach-Zehnder Transmitter with Full-Band Tunability", OFC/NFOEC 2007, paper OWH6. describes a Mach-Zehnder modulator for which each of the two arms can be driven by a separate signal, and then drives the two arms individually with each pair of a differential driver. However, in this case each arm receives the signal from a separate coplanar waveguide with its own ground conductors, and each arm is separately terminated by a 50 ohm resistor. Such a configuration is not compatible with a two-conductor series push-pull travelling wave electrode, and as a result suffers from a limitation on the bandwidth. Although figure 1a shows only two signal electrodes, there is also a grounded conducting substrate running beneath the signal electrodes, which negates the possibility of using a series push-pull Mach-Zehnder optical modulator and the high bandwidth thereof. In other words, this ground plane in the Betty device provides an electrical return path for each signal electrode, so the two signal paths do not act as return paths for each other.

SUMMARY OF THE INVENTION

This invention provides an electrical waveguide transmission device that accepts a differential electrical input signal (e.g., S+ and S−) propagating along two separate signal conductors with grounded electrical return paths, and outputs the differential input signal to a series push-pull traveling wave electrode Mach-Zehnder modulator over a pair of output conductors that act as a return path for each other (i.e., without the need for a grounded conductor) and provide a desired characteristic impedance matching that of the Mach-Zehnder modulator.

In particular, the two input signal conductors of the electrical waveguide transmission device have at least one input ground conductor interposed between them. This configuration of input signal conductors and input ground conductors forms a first waveguide between the first input signal conductor and a ground conductor having a first characteristic impedance, and also forms a second waveguide between the second input signal conductor and a ground conductor having a second characteristic impedance. The differential input signal is output via two output signal conductors that have no ground conductor interposed between them. These output signal conductors form a third waveguide having a third characteristic impedance that is the sum of the first and second characteristic impedances, and is also equal to the characteristic impedance of the Mach-Zehnder traveling wave electrode.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 5:
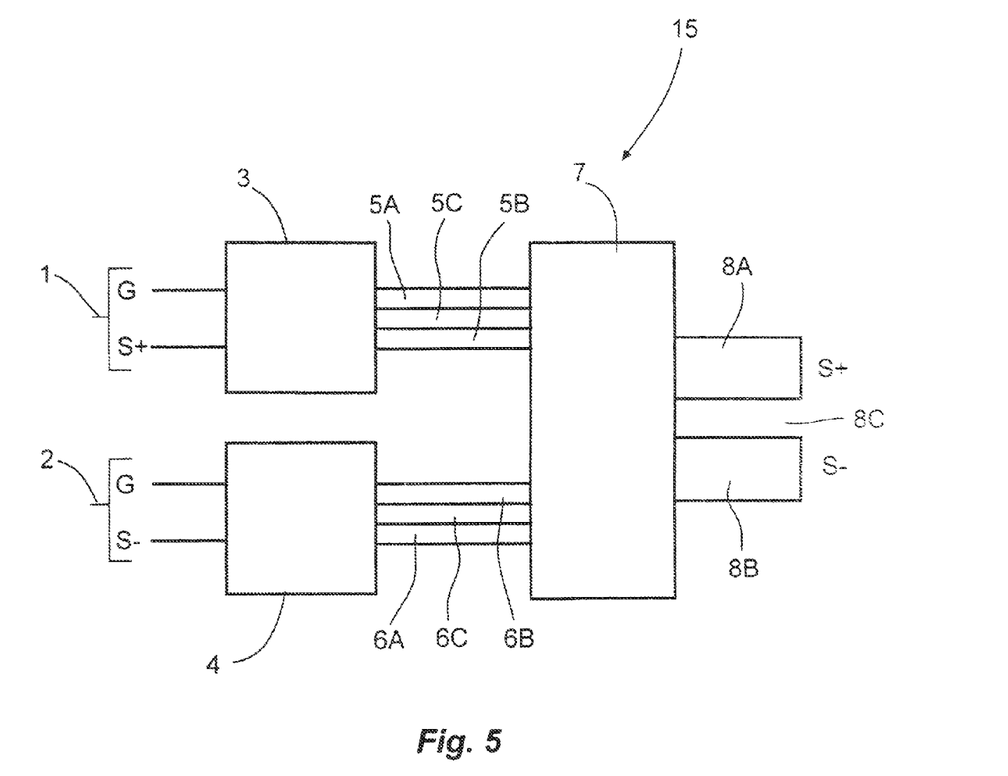
FIG. 5 is a block diagram of an electrical waveguide transmission device 15 embodying the present invention.

Turning to FIG. 5, a block diagram is shown of an electrical waveguide transmission device embodying the present invention. The device accepts a differential electrical input signal (e.g., S+ and S−) propagating along two separate input differential transmission lines 1 and 2. The first input differential transmission line 1 consists of a first signal (S+) conductor and at least one ground (G) conductor, and has a predetermined first characteristic impedance. Similarly, the second input differential transmission line 2 consists of a second signal (S−) conductor and at least one ground (G) conductor, and has a second characteristic impedance.

A transition 3 is provided from the first input differential transmission line 1 to a first differential coplanar stripline 5, and a transition 4 is provided from the second input differential transmission line 2 to a second differential coplanar stripline 6. The first differential coplanar stripline 5 includes a signal conductor 5A, a ground conductor 5B, and a dielectric material 5C (e.g., air or vacuum) interposed between and adjacent to the signal conductor 5A and ground conductor 5B. The signal conductor 5A, the ground conductor 5B and dielectric material 5C are specifically designed and arranged so as to be substantially in the same plane, and the width, thickness, and conductance of the signal conductor 5A and ground conductor 5B, and the width, thickness and dielectric constant of the dielectric material 5C are such that the first coplanar stripline has a characteristic impedance substantially the same as the first characteristic impedance.

Similarly, a second differential coplanar stripline 6 includes a signal conductor 6A, a ground conductor 6B, and a dielectric material 6C interposed between and adjacent to them. Here again, the signal conductor 6A, the ground conductor 6B and dielectric material 6C are arranged so as to be substantially in the same plane. The width, thickness, and conductance of the signal conductor 6A and ground conductor 6B, and the width, thickness and dielectric constant of the dielectric material 6C are such that the second coplanar stripline 6 has a characteristic impedance substantially the same as the second characteristic impedance.

A combiner 7 takes as input the first differential coplanar stripline 5 and the second differential coplanar stripline 6 and has as its output a third differential coplanar stripline 8. The third differential coplanar stripline 8 has a first output signal (S+) conductor 8A and a second output signal (S−) conductor 8B leading to the series traveling wave electrode of an Mach-Zehnder optical modulator (not shown in FIG. 5). Here again, it should be noted that S− is in anti-phase with respect to S+. A dielectric material 8C (e.g., air or vacuum) is interposed between and adjacent to the two output signal conductors 8A and 8B. The two output signal conductors 8A and 8B, and dielectric material 8C are arranged so as to be substantially in the same plane. However, there is no ground conductor between the two output signal conductors 8A and 8B. The width, thickness, and conductance of the output signal conductors 8A and 8B, and the width, thickness and dielectric constant of the dielectric material 8C are such that the third coplanar stripline 8 has a third characteristic impedance which is the sum of the first and second characteristic impedances. Preferably, this third characteristic impedance is also equal to the input impedance of the Mach-Zehnder optical modulator 10.

Note that in discussing the differential coplanar striplines 5, 6 and 8 above, it is mentioned that conductors and materials can be arranged so as to achieve a given target characteristic impedance. This practice should be straight-forward for someone skilled in the art of microwave waveguide design. There are readily available tools and methods for determining critical dimensions and materials for many different transmission lines such as microstrip, co-planar waveguide and differential coplanar microstrip. For example, Agilent distributes a free application called "AppCAD" that can be readily employed to calculate a microstrip impedance. The user enters the conductor width, dielectric material type and height and the application calculates the characteristic impedance of the transmission line.

Figure 6:
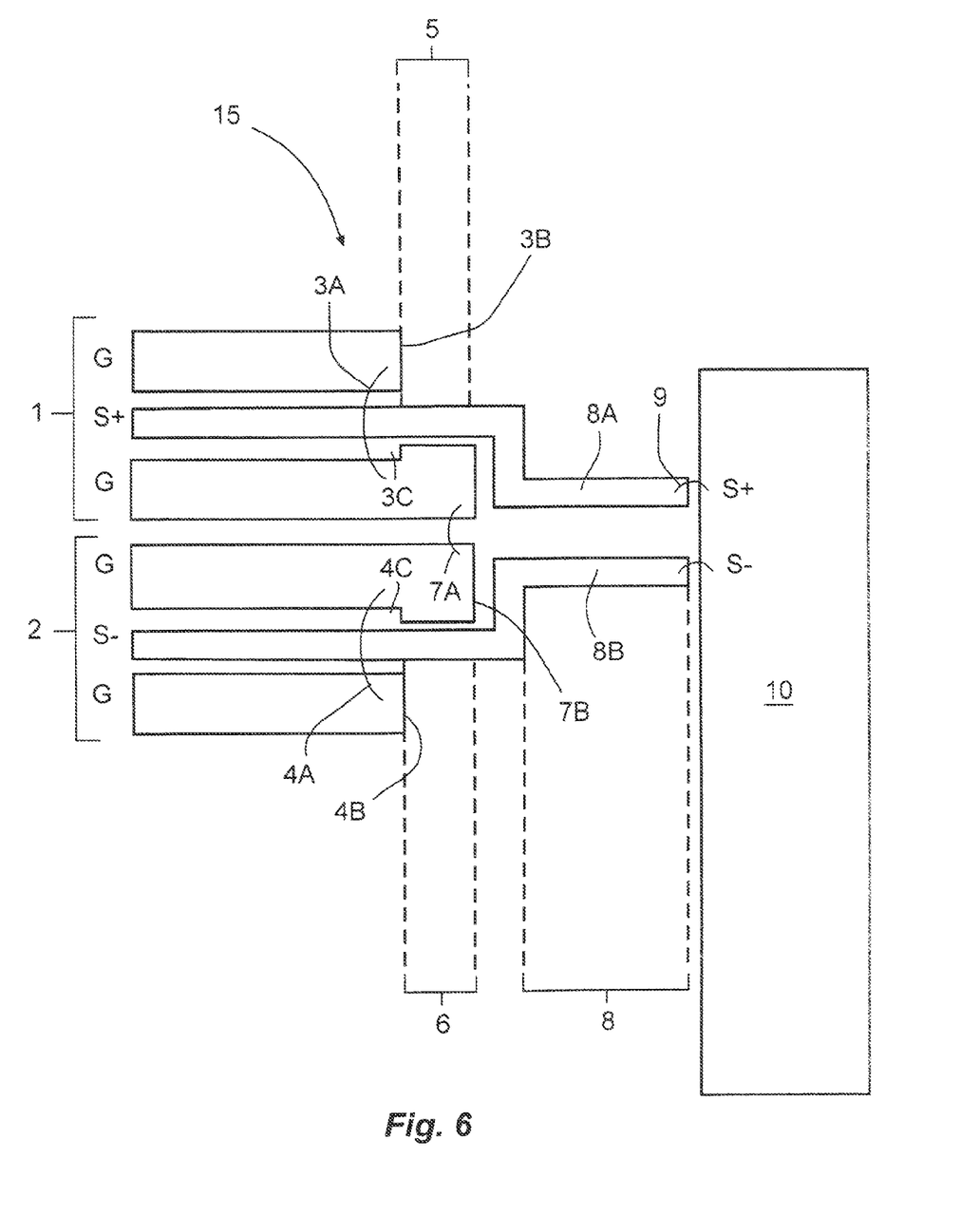
FIG. 6 is a diagram of an embodiment of the electrical waveguide transmission device 15.

FIG. 6 is a diagram of an embodiment of the electrical waveguide transmission device 15. In this embodiment the input differential transmission lines are two separate coplanar waveguides 1 and 2, each having one signal conductor (S) and two ground conductors (G) arranged on either side of the signal conductor. Preferably, the signal conductor and ground conductors are substantially in the same plane. Dielectric materials are interposed between and adjacent to each ground conductor and the signal conductor. As before, the width, thickness, and conductance of the signal conductor and ground conductors, and the width, thickness and dielectric constant of the dielectric materials, are selected to achieve a desired characteristic impedance (e.g., 50 ohms) for both coplanar waveguides 1 and 2.

A transition 3 is provided from the first input differential transmission line 1 to a first differential coplanar stripline that includes a gold wirebond 3A connecting the two ground conductors and looping over the signal conductor. Alternatively, this could be a plurality of wirebonds or air-bridges. The transition 3 also has a termination of the outer ground conductor in the direction of signal flow 3B; and a change to the width, thickness or conductivity of the signal conductor or unterminated ground conductor, or the width, thickness or dielectric constant of the interposed dielectric material so as to maintain the desired characteristic impedance (e.g., 50 ohms) of the resulting coplanar stripline formed by the signal conductor, the remaining unterminated ground conductor, and the interposed dielectric material 3C. A similar transition 4 is provided from the second input differential transmission line 2 to a second differential coplanar stripline. Short sections 5 and 6 of coplanar striplines extend between the transitions 3, 4 and combiner 7 (discussed below). These sections of the coplanar striplines are formed by the remaining unterminated ground conductor and the signal conductor of each transmission line.

A combiner 7 takes as its inputs the first differential coplanar stripline and the second differential coplanar stripline and has as its output a third differential coplanar stripline 8. The combiner 7 has a wirebond 7A connecting the two ground conductors. Here again, this could be a plurality of wirebonds, or air-bridges. The combiner 7 also includes: (1) a termination in the direction of signal flow of the unterminated ground conductor of the first differential coplanar stripline; (2) a termination 7B in the direction of signal flow of the unterminated ground conductor of the second differential coplanar stripline; (3) a change to the width, thickness or conductivity of the signal conductor of the first differential coplanar stripline; (4) a change to the width, thickness or conductivity of the signal conductor of the second differential coplanar stripline; and (5) a change to the width, thickness, or dielectric constant of the dielectric material interposed between the signal conductor of the first differential coplanar stripline 5 and the signal conductor of the second differential coplanar stripline 6.

The third differential coplanar stripline 8 carrying the output (S+ and S−) from the combiner 7 includes a pair of output signal conductors 8A and 8B, and a dielectric material 8C (e.g., air or vacuum) interposed between and adjacent to the output signal conductors 8A, 8B. Once again, the output signal conductors 8A, 8B and dielectric material 8C are arranged so as to be substantially in the same plane. Also, the width, thickness, and conductance of the output signal conductors 8A, 8B and the width, thickness and dielectric constant of the dielectric material 8C are such that the third differential coplanar stripline 8 has a desired third characteristic impedance (e.g., 100 ohms).

A transition 9 is provided from the third differential coplanar stripline 8 to a series push-pull travelling wave Mach-Zehnder modulator 10. This transition 9 can be a pair of gold wirebonds connecting the output signal conductors 8A, 8B of the third differential coplanar stripline 8 to two Mach-Zehnder conductors that form a differential Mach-Zehnder travelling wave electrode.

Figure 7:
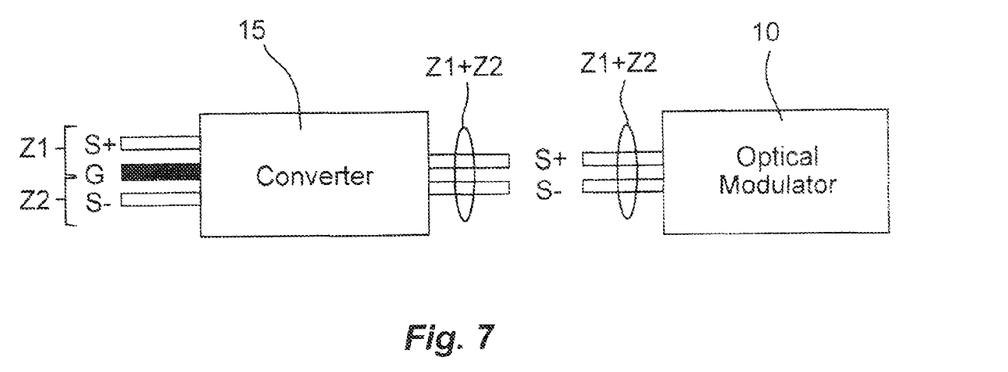
FIG. 7 is a diagram of an embodiment of the electrical waveguide transmission device 15 having an input ground conductor.

FIG. 7 is a diagram of an embodiment of the electrical waveguide transmission device 15 having an input ground conductor (G) interposed between the input signal conductors conveying the differential electrical input signal (S+ and S−). A first waveguide is formed between the first input signal conductor and the input ground conductor having a first characteristic impedance (Z1), and a second waveguide is formed between the second input signal conductor and the input ground conductor having a second characteristic impedance (Z2). The pair of output signal conductors have no ground conductor interposed between them. The output signal conductors form a third waveguide having a third characteristic impedance that is the sum of the first and second characteristic impedances (Z1+Z2). In addition, there is no conductor connected to the ground of the present device that is interposed between the conductors of the Mach-Zehnder traveling wave electrode. The Mach-Zehnder signal electrodes form a waveguide having a characteristic impedance which is equal to the third characteristic impedance of the device (Z1+Z2).

Figure 8:
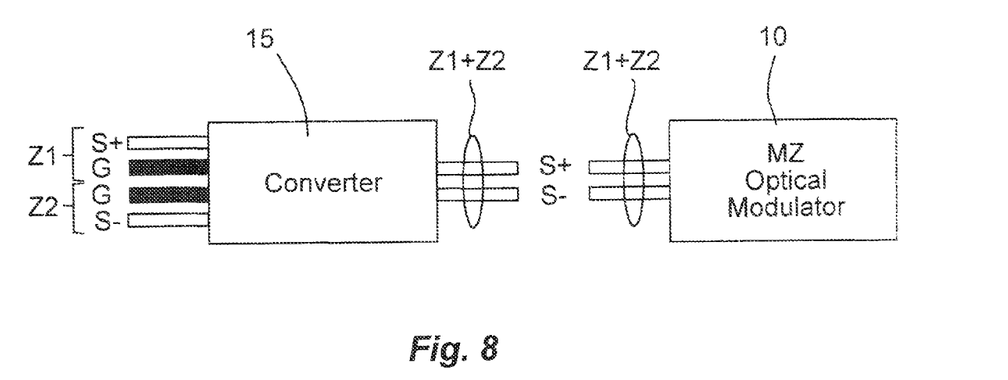
FIG. 8 is a diagram of an embodiment of the electrical waveguide transmission device 15 having two input ground conductors.

FIG. 8 is a diagram of an embodiment of the electrical waveguide transmission device 15 having two input ground conductors. Each of the input signal conductors is paired with one of the input ground conductors.

Figure 9:
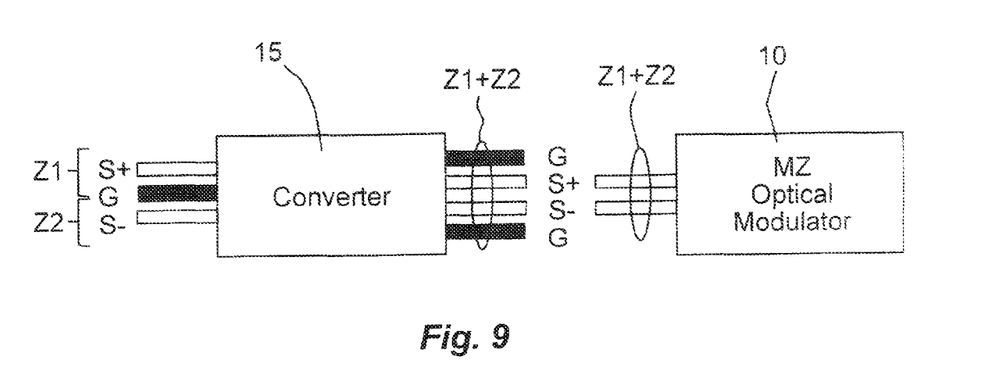
FIG. 9 is a diagram of an embodiment of the electrical waveguide transmission device 15 having two output ground conductors.

FIG. 9 is a diagram of an embodiment of the electrical waveguide transmission device 15 having two output ground conductors. The output of the converter has two output ground conductors arranged such that the output signal conductors are interposed between the two ground conductors. All four conductors form a waveguide having a characteristic impedance that is the sum of the first and second characteristic impedances (Z1+Z2).

Figure 10:
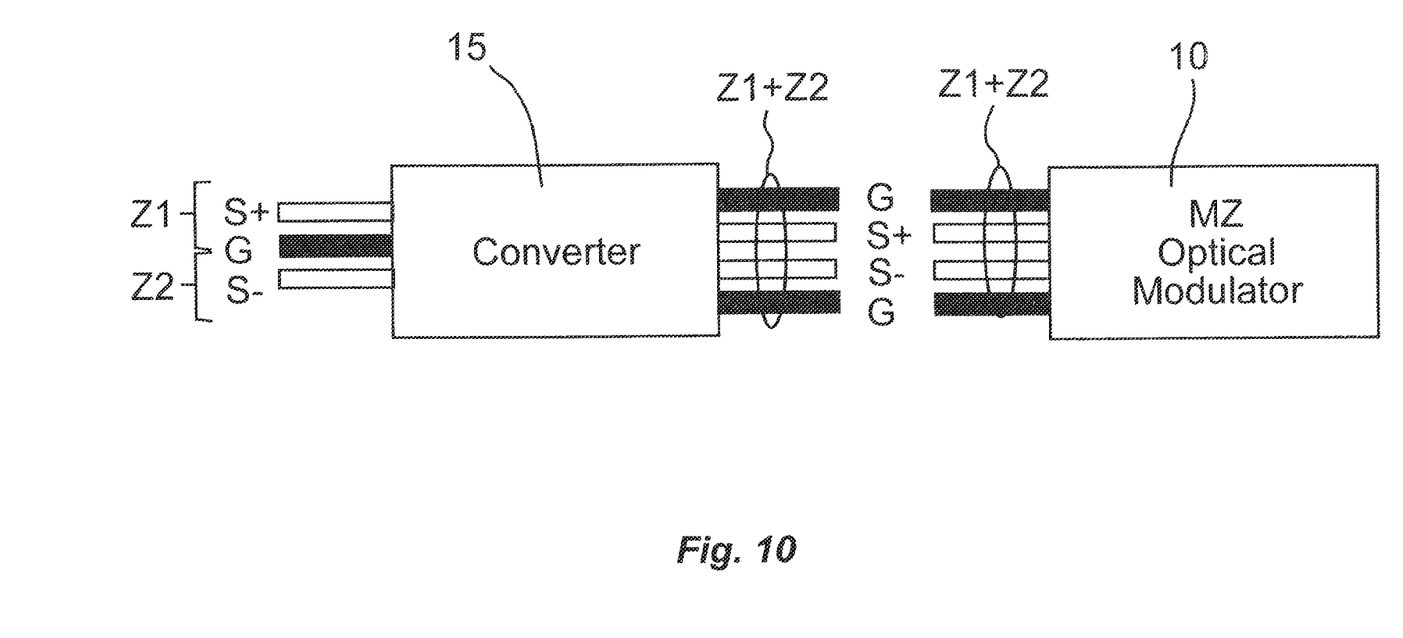
FIG. 10 is a diagram corresponding to FIG. 9 in which the Mach-Zehnder modulator 10 also has two ground conductors at its input.

FIG. 10 is a diagram corresponding to FIG. 9 in which the Mach-Zehnder modulator 10 also has two ground conductors at its input. The Mach-Zehnder optical modulator 10 additionally has two Mach-Zehnder ground conductors arranged such that the Mach-Zehnder signal electrodes are interposed between the Mach-Zehnder ground conductors. All four conductors form a waveguide having a characteristic impedance that is the sum of the first and second characteristic impedances (Z1+Z2).

Figure 11:
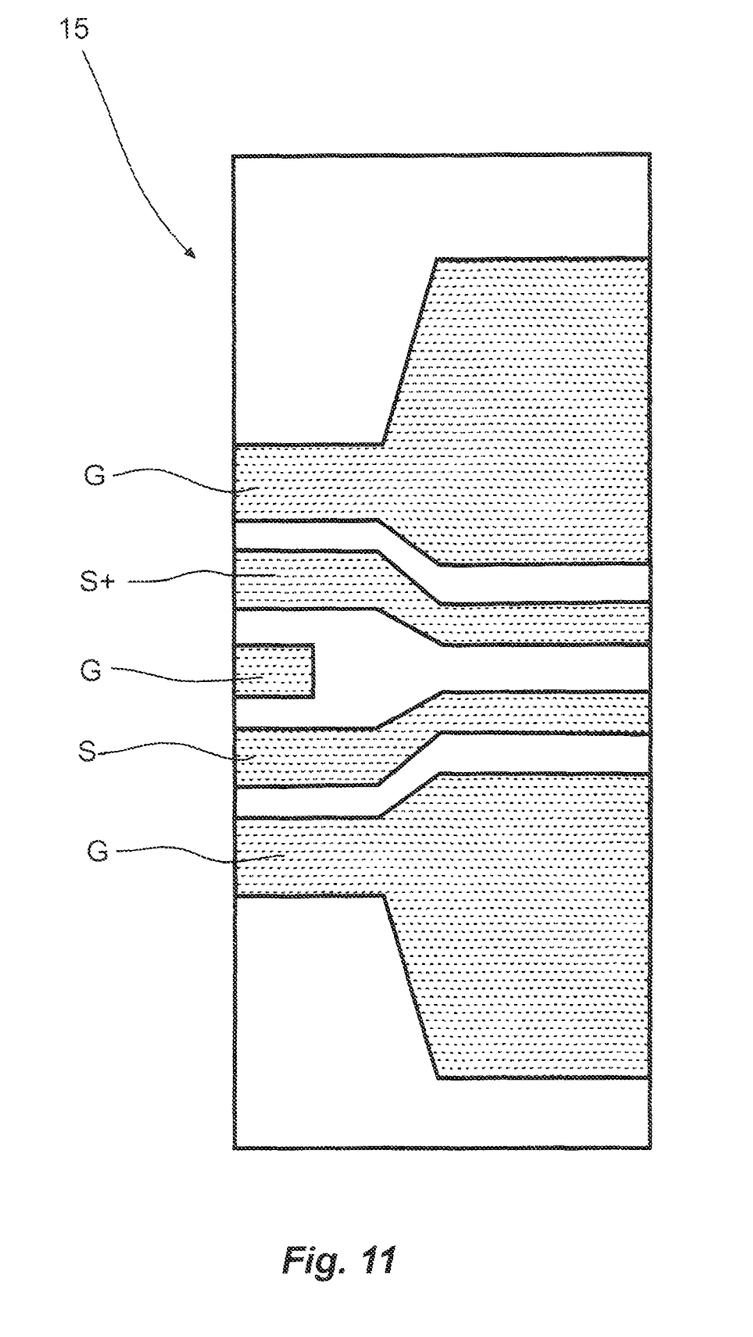
FIG. 11 is a diagram of an embodiment of an electrical waveguide transmission device 15 converting from a GSGSG input to a GSSG output implemented on aluminum nitride.

FIG. 11 is a diagram of an embodiment of an electrical waveguide transmission device 15 converting from a GSGSG input to a GSSG output, implemented on aluminum nitride. On the input side of the converter 15, all conductors have a width of 100 µm, and the spaces between conductors have a width of 62.5 µm. Termination of the middle ground conductor occurs at about 150 µm along the x-axis from the input side. The transitions in the widths of the outer signal and ground conductors begin at about 250 µm and end at about 350 µm along the x-axis. On the output side of the converter 15, the outer ground conductors have a width of about 508 µm and the signal conductors have a width of about 60 µm. The spaces between the signal conductors and ground conductors have a width of about 95 µm.

Figure 12:
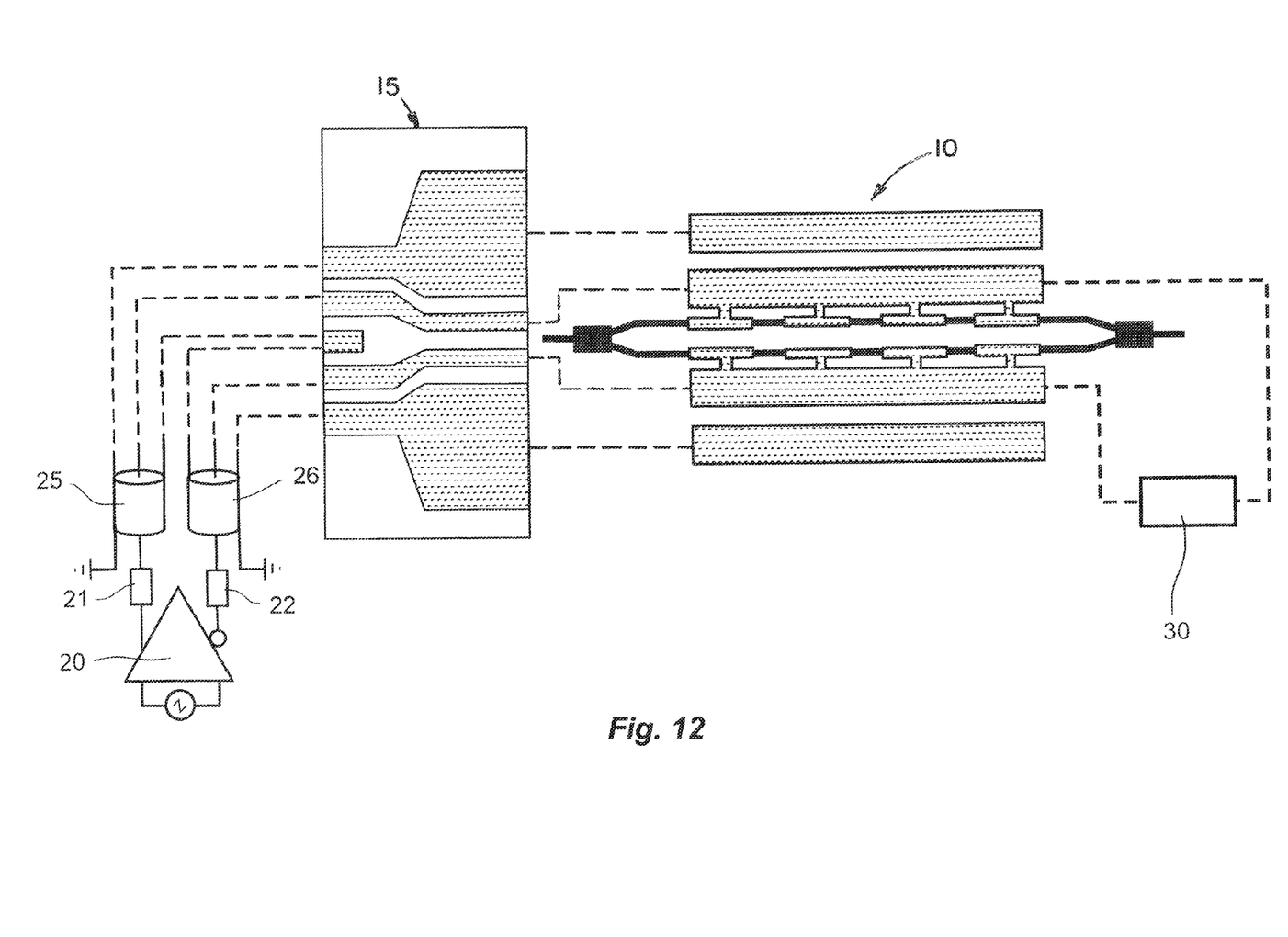
FIG. 12 is a schematic diagram of the electrical waveguide transmission device 15 of FIG. 11 in a configuration with a differential drive 20 at the input, and a GSSG series push-pull Mach-Zehnder optical modulator 10.
Figure 13:
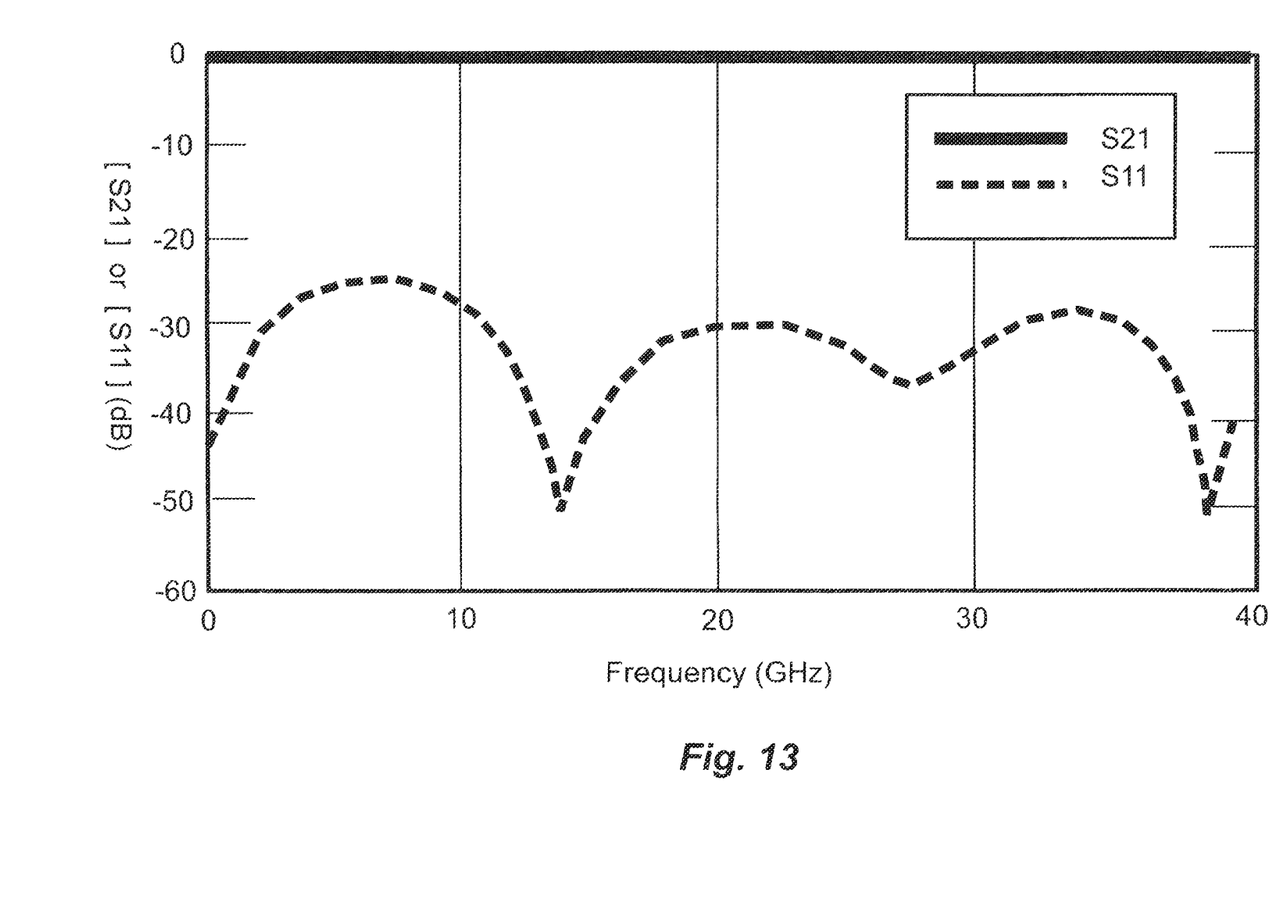
FIG. 13 is a graph showing the simulated fraction of power delivered to the distal load (S21), and reflected back to the driver (S11) in the embodiment of FIG. 12.

FIG. 12 is a schematic diagram of the electrical waveguide transmission device 15 of FIG. 11 in a configuration with a differential drive 20 at the input, and a GSSG series push-pull Mach-Zehnder optical modulator 10 with a matching terminating load 30 in the preferred embodiment. For example, the driver output impedance of Z1 equals 50 ohms; the driver complementary output impedance of Z2 equals 50 ohms; and the distal load impedance of Z3 equals 100 ohms. FIG. 13 is a graph showing the simulated fraction of power delivered to the distal load (S21), and reflected back to the driver (S11) in this example embodiment of FIG. 12. Note that excellent broadband performance is possible using this embodiment of the present invention.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

I claim:

1. An electrical waveguide transmission device that accepts a differential electrical input signal and conveys the input signal to a Mach-Zehnder optical modulator having a series push-pull traveling wave electrode with first and second Mach-Zehnder signal electrodes having a characteristic impedance; said device comprising:
   a first input signal conductor and a second input signal conductor accepting a differential electrical input signal;
   at least one input ground conductor interposed between the first and second signal input conductors, forming a first waveguide between the first input signal conductor and a ground conductor having a first characteristic impedance, and forming a second waveguide between the second input signal conductor and a ground conductor having a second characteristic impedance;
   a first output signal conductor; and
   a second output signal conductor without a ground conductor interposed between the first and second output signal conductors; said first and second output signal conductors forming a third waveguide having a third characteristic impedance that is the sum of the first and second characteristic impedances, and is also substantially equal to the characteristic impedance of the Mach-Zehnder traveling wave electrode.

2. The device of claim 1 wherein the at least one input ground conductor comprises two ground conductors interposed between the first and second input signal conductors.

3. The device of claim 1 further comprising two output ground conductors arranged with the first and second output signal conductors interposed between the two ground conductors, and wherein the output ground conductors and the first and second output signal conductors form a waveguide having a characteristic impedance that is the sum of the first and second characteristic impedances.

4. The device of claim 3 wherein the Mach-Zehnder optical modulator further comprises two Mach-Zehnder ground conductors with the two Mach-Zehnder signal electrodes interposed between the Mach-Zehnder ground conductors, and wherein the Mach-Zehnder ground conductors and Mach-Zehnder signal electrodes form a waveguide having a characteristic impedance that is the sum of the first and second characteristic impedances.

5. The device of claim 1 wherein the first and second characteristic impedances are each 50 ohms, and the third characteristic impedance is 100 ohms.

6. An electrical waveguide transmission device that accepts a differential electrical input signal and conveys the input signal to a Mach-Zehnder optical modulator having a series push-pull traveling wave electrode with first and second Mach-Zehnder signal electrodes having a characteristic impedance; said device comprising:

a first input differential transmission line with a first input signal conductor and at least one ground conductor having a first characteristic impedance;

a second input differential transmission line with a second input signal conductor and at least one ground conductor having a second characteristic impedance, wherein said first and second input signal conductors accept a differential electrical input signal;

a first transition from the first input differential transmission line to a first differential coplanar stripline having a signal conductor, a ground conductor and a dielectric material interposed between the signal conductor and ground conductor, with a characteristic impedance substantially equal to the first characteristic impedance;

a second transition from the second input differential transmission line to a second differential coplanar stripline having a signal conductor, a ground conductor and a dielectric material interposed between the signal conductor and ground conductor, with a characteristic impedance substantially equal to the second characteristic impedance; and a combiner taking as inputs the first and second differential coplanar striplines and outputting to a third differential coplanar stripline having a first output signal conductor and a second output signal conductor to the Mach-Zehnder optical modulator, without a ground conductor interposed between the first and second output signal conductors; said third differential coplanar stripline having a third characteristic impedance that is the sum of the first and second characteristic impedances, and is also substantially equal to the characteristic impedance of the Mach-Zehnder traveling wave electrode.

7. The device of claim 6 wherein the at least one input ground conductor of the first and second input differential transmission lines comprise two ground conductors interposed between the first and second input signal conductors.

8. The device of claim 6 further comprising two output ground conductors arranged on the third differential coplanar stripline with the first and second output signal conductors interposed between the two output ground conductors, and wherein the output ground conductors and the first and second output signal conductors form a waveguide having a characteristic impedance that is the sum of the first and second characteristic impedances.

9. The device of claim 8 wherein the Mach-Zehnder optical modulator further comprises two Mach-Zehnder ground conductors with the two Mach-Zehnder signal electrodes interposed between the Mach-Zehnder ground conductors, and wherein the Mach-Zehnder ground conductors and Mach-Zehnder signal electrodes form a waveguide having a characteristic impedance that is the sum of the first and second characteristic impedances.

10. The device of claim 6 wherein the first and second characteristic impedances are each 50 ohms, and the third characteristic impedance is 100 ohms.

* * * * *